United States Patent

Kalis, Jr.

[11] Patent Number: 5,879,046
[45] Date of Patent: Mar. 9, 1999

[54] VEHICLE DOOR MANUFACTURE

[75] Inventor: George Kalis, Jr., Wooster, Ohio

[73] Assignee: Stahl/Scott Fetzer Company, Wooster, Ohio

[21] Appl. No.: 630,676

[22] Filed: Apr. 12, 1996

[51] Int. Cl.⁶ .................................................. B60J 5/04
[52] U.S. Cl. ........................ 296/146.5; 296/191; 49/501
[58] Field of Search .................. 296/146.5, 37.6, 296/57.1, 191; 49/501, 502

[56] References Cited

U.S. PATENT DOCUMENTS

| 3,954,150 | 5/1976 | Cole et al. | 296/191 X |
| 4,968,084 | 11/1990 | Asher et al. | 296/57.1 X |
| 5,239,753 | 8/1993 | Kalis, Jr. et al. | 29/897.2 |
| 5,446,999 | 9/1995 | Inaba et al. | 296/146.5 X |
| 5,449,213 | 9/1995 | Kiley et al. | 296/146.5 X |
| 5,536,060 | 7/1996 | Rashid et al. | 296/146.5 X |

FOREIGN PATENT DOCUMENTS 406080022 3/1994 Japan ................................ 296/146.5

*Primary Examiner*—Joseph D. Pape
*Attorney, Agent, or Firm*—Watts, Hoffmann, Fisher & Heinke, Co., L.P.A.

[57] ABSTRACT

A vehicle door is made by providing a first sheet metal door panel with fastening portions at a peripheral portion of the first door panel. The fastening portions each have at least a portion that extends at a first angle of not greater than 90 degrees with respect to a body of the first door panel. A second sheet metal door panel is provided with flange portions at a peripheral portion of the second door panel. The flange portions extend transverse to a body of the second door panel. The vehicle door is formed by fastening each of at least two of the fastening portions of the first door panel to an associated one of the flange portions of the second door panel.

14 Claims, 4 Drawing Sheets

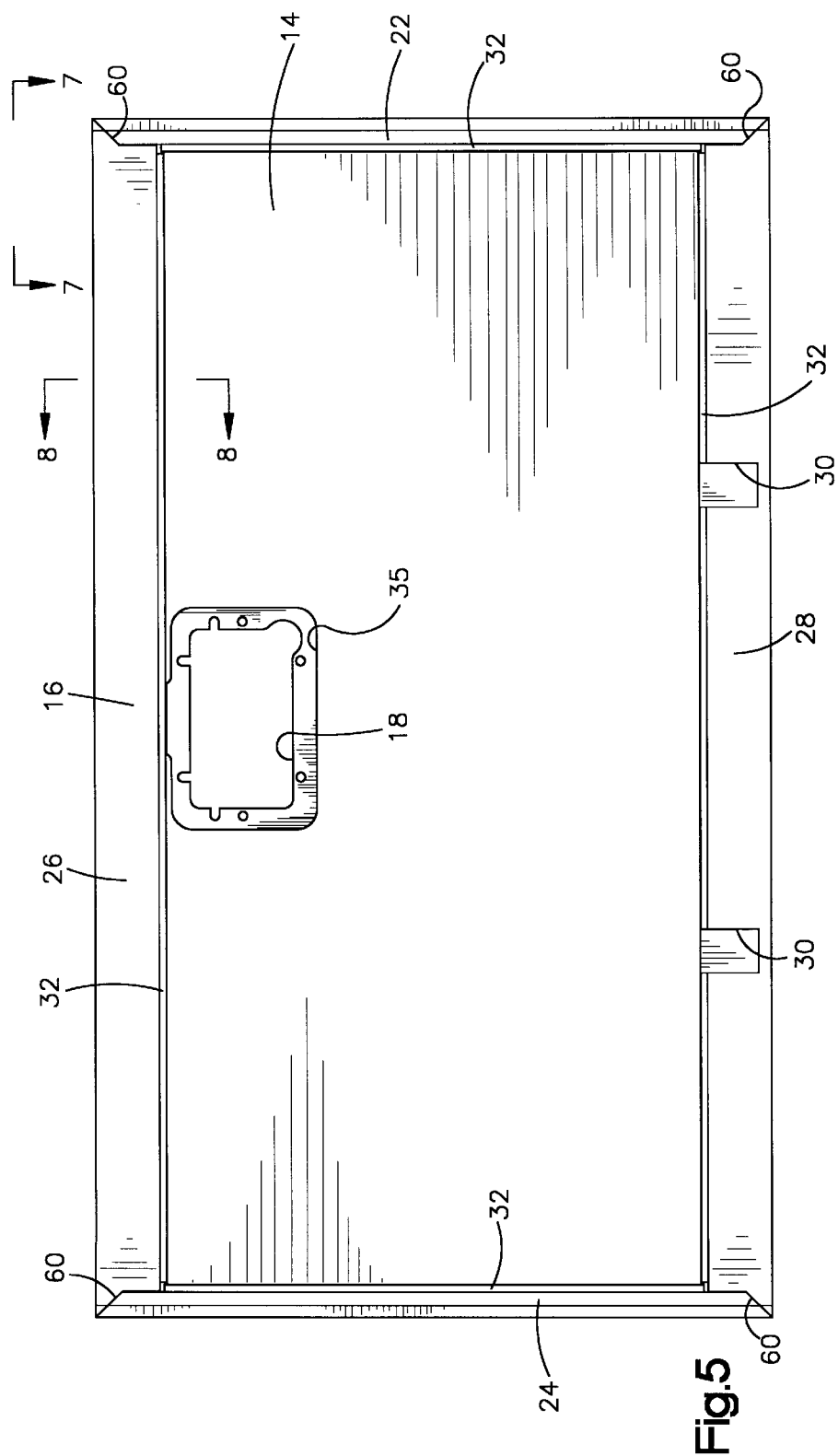
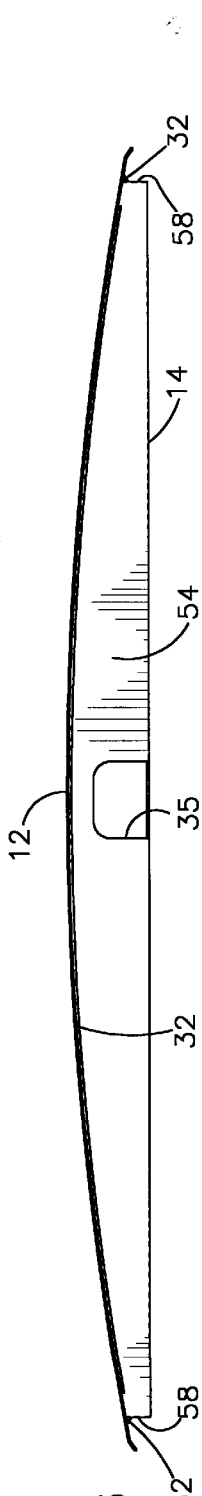
Fig.5
Fig.6

VEHICLE DOOR MANUFACTURE

FIELD OF THE INVENTION

This invention pertains to doors for motor vehicles and in particular, to truck doors and a method of manufacturing them.

BACKGROUND OF THE INVENTION

Utility truck bodies often have a box-like, non-aerodynamic appearance. This box-like appearance lends itself to relatively simple manufacturing processes for making doors for the truck bodies. However, a trend in the manufacture of trucks today is to provide the truck body with aesthetically pleasing lines, which calls for some curved body panels. The process of manufacturing curved body panels increases the cost and complexity of the truck door construction.

Curved truck door panels are typically formed by a metal-forming process that requires the use of special dies. These dies are provided with a shaped surface for pressing the sheet metal into a desired shape, and greatly increase the cost of the truck body. Thus, there is a need for an inexpensive method for producing curved vehicle door panels.

U.S. Pat. No. 5,239,753 to Kalis Jr. et al., which is incorporated herein by reference in its entirety, relates to a method that employs a jig having curved supports for imparting a curvature to an outer door panel. An inner door panel is fastened to the outer door panel by aligning openings in tabs of the outer door panel with openings in ribs of the inner door panel and by riveting the tabs to the ribs. This method of joining the inner and outer door panels increases the complexity and thus the expense of the door manufacturing process.

SUMMARY OF THE INVENTION

The present invention relates to sheet metal vehicle doors and a method of making them efficiently and inexpensively. In the present invention inner and outer door panels are fastened together in a manner that avoids the complexity of the prior art.

The invention relates to a vehicle door including first and second sheet metal door panels. The first door panel includes fastening portions at a peripheral portion of the first door panel. Each of the fastening portions has at least a portion that extends at a first angle of less than 90 degrees with respect to a body of the first door panel. The second door panel includes flange portions at a peripheral portion of the second door panel. Each of the flange portions extends transverse to a body of the second door panel. The flange portions of the second door panel are disposed adjacent the fastening portions of the first door panel. A fastener connects at least two of the fastening portions to their associated flange portions.

In a preferred embodiment, the first door panel is an outer door panel and the second door panel is an inner door panel. The first angle at which each of the fastening portions extends is about 45 degrees with respect to the body of the first door panel. The flange portions each extend from the second door panel at an angle of about 90 degrees with respect to the body of the second door panel. The fastening portions and their associated flange portions are preferably welded together.

Because the fastening portions extend at an angle such as 45° with respect to the outer door panel body and are preferably welded to the flange portions, the method of the present invention is more efficient than that disclosed in the U.S. Pat. No. 5,239,753. The present invention does not require carefully aligning openings in tabs and ribs and riveting the tabs to the ribs. Moreover, by extending the fastening portions from the body portion of the outer door panel by a predetermined angle such as 45°, the inner and outer door panels may be welded together without any substantial warpage or distortion.

A method of making a vehicle door according to the present invention generally includes the step of providing the first door panel with the peripheral fastening portions that each has at least a portion that extends from the body of the first door panel by the first angle of not greater than 90 degrees. The second door panel is provided with a plurality of the peripheral flange portions extending transverse to the body of the second door panel. The second door panel is connected to the first door panel by fastening the flange portions of the second door panel to the fastening portions of the first door panel preferably by welding.

In a preferred method of the present invention the first door panel is an outer door panel and the second door panel is an inner door panel. The method includes the step of compressing the first door panel edgewise to provide the first door panel with a curvature. The fastening portions each extend preferably by about 45 degrees with respect to the body of the first door panel. At least two of the fastening portions are each fastened to their associated flange portion preferably by welding.

Another preferred method of making a vehicle door according to the present invention includes the step of positioning the outer door panel in a jig having a curved surface portion. The outer door panel is compressed edgewise to provide the outer door panel with a curvature conforming to a curvature of the curved surface portion of the jig. The inner door panel is connected to a concave side of the outer door panel by engaging the inner door panel flanges with the outer door panel fastening portions. At least two of the fastening portions are each fastened to their associated flanges preferably by welding. The connected inner and outer door panels are removed from the jig.

Other embodiments of the invention are contemplated to provide particular features and structural variants of the basic elements. The specific embodiments referred to as well as possible variations and the various features and advantages of the invention will become better understood from the detailed description that follows, together in connection with the accompanying drawings.

BRIEF DESCRIPTION OF THE DRAWINGS

FIG. 5 is an elevational view of the inside of the door assembly shown in FIG. 2;

FIG. 6 is a top plan view of the door assembly shown in FIG. 5;

DETAILED DESCRIPTION OF PREFERRED EMBODIMENTS

Figure 1:
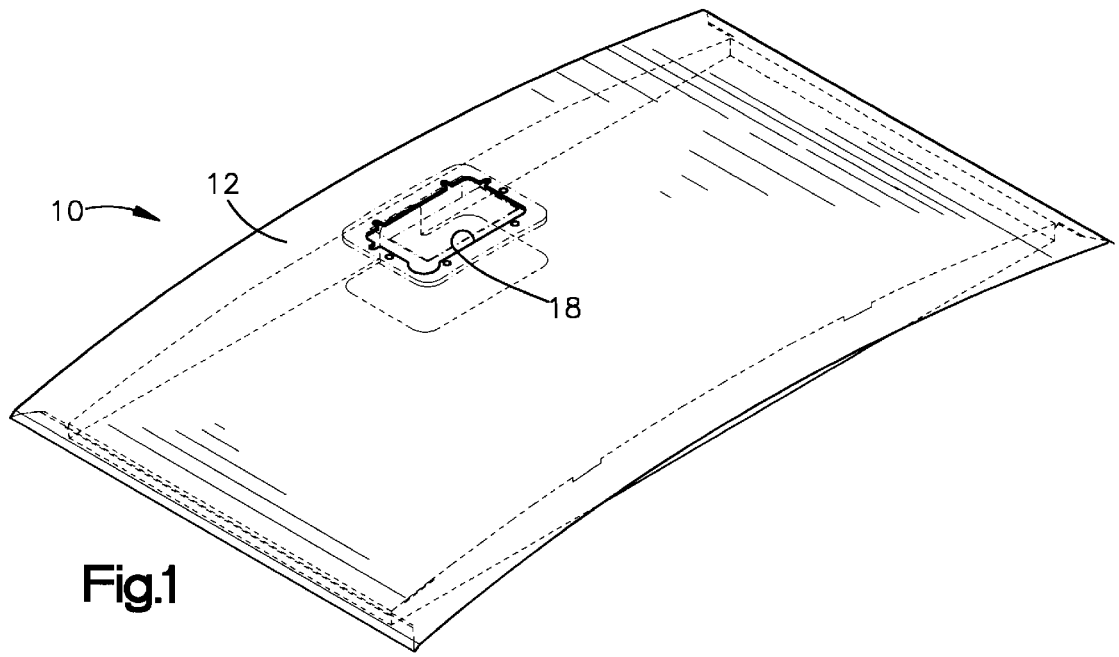
FIG. 1 is a perspective view showing the outside of a door assembly constructed in accordance with the present invention.
Figure 2:
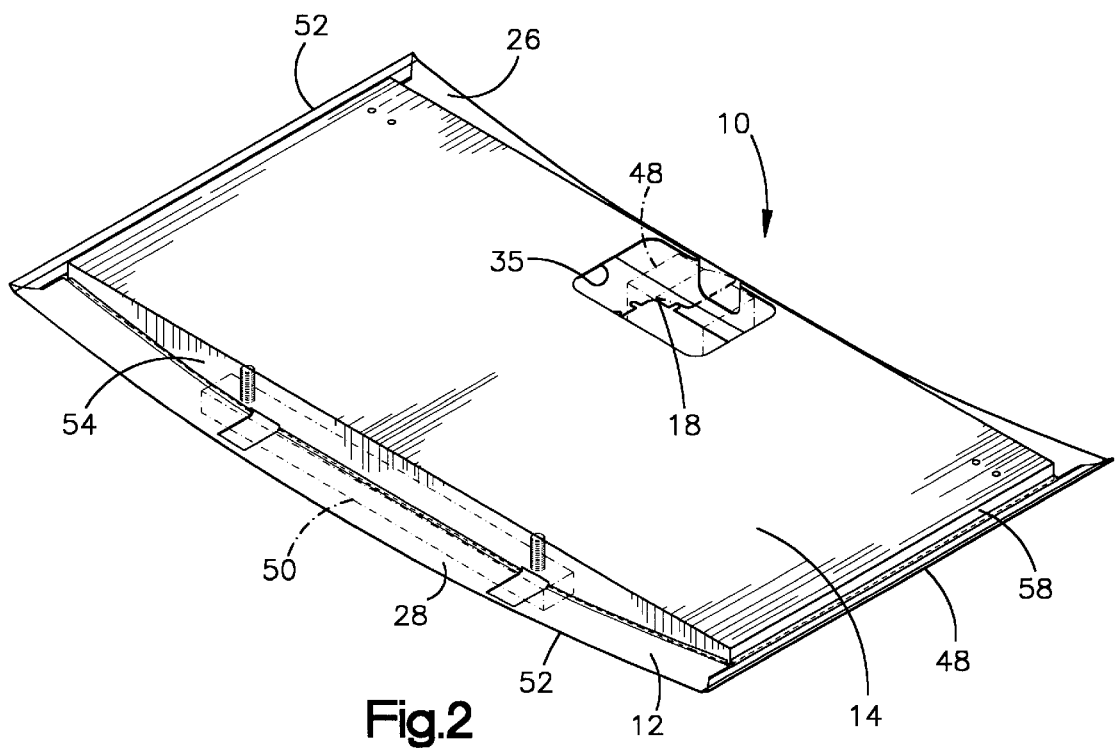
FIG. 2 is a perspective view showing the inside of the door assembly of FIG. 1, in which inner and outer door panels are shown.

Turning now to FIGS. 1 and 2 of the drawings, there is shown a door assembly 10 for a vehicle such as a truck. The door assembly 10 includes an outer door panel 12 and an inner door panel 14. The inner and outer door panels 14, 12 are preferably formed of sheet metal such as 20 gauge steel. The door assembly 10 is preferably used for a compartment formed in the side of a truck, which can hold tools, equipment and the like.

Figure 3:
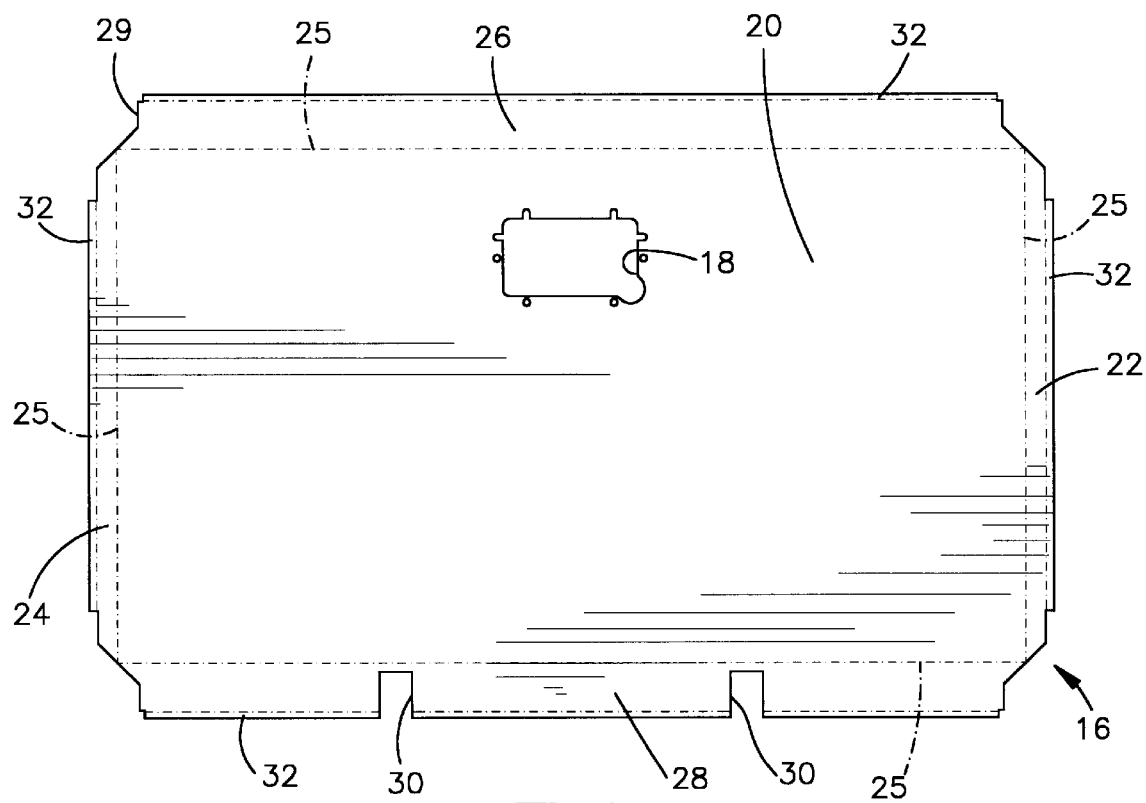
FIG. 3 is an elevational view showing the inside of an outer blank from which the outer door panel shown in FIG. 1 is formed.

The outer door panel 12 is formed from an outer sheet metal blank 16 shown in FIG. 3. The outer blank 16 includes a first door latch cutout 18, a generally rectangular central body portion 20 as defined by dotted margin lines 25 and four margins surrounding the body portion. The margins include a first side margin 22, a second side margin 24, a third end margin 26 and a fourth end margin 28. The fourth end margin 28 includes first hinge cutouts 30. The outer blank 16 also includes four fastening portions 32 that are each located within a region of one of the margins.

Figure 4:
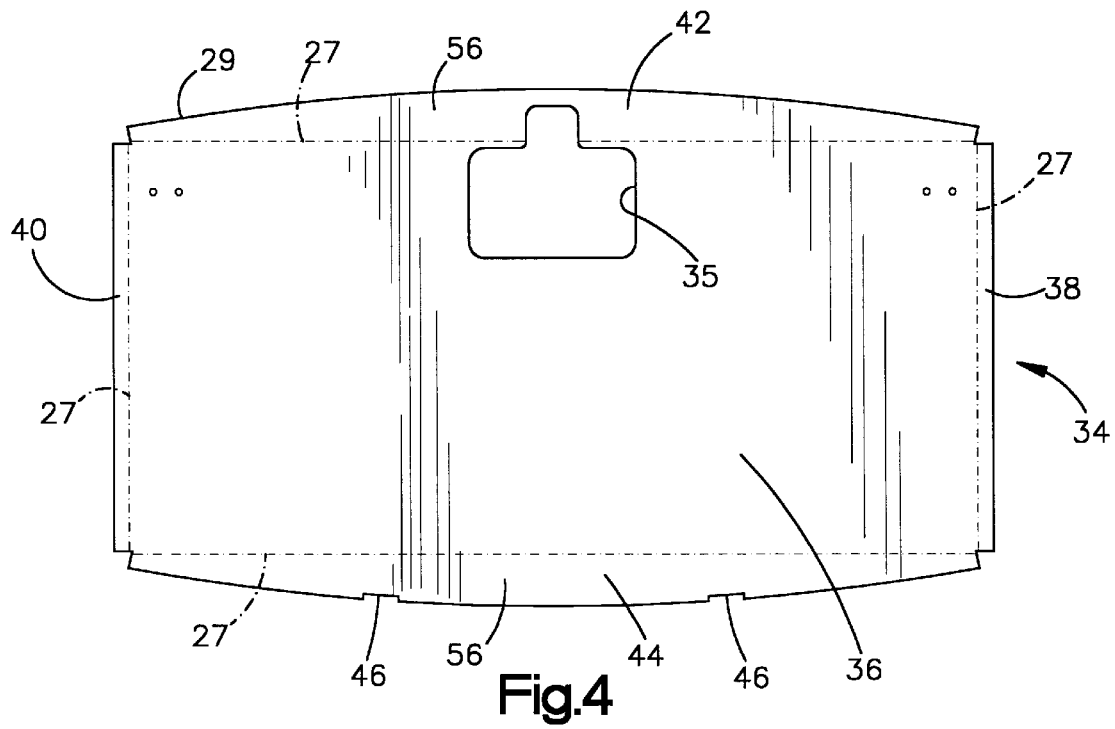
FIG. 4 is an elevational view showing the inside of an inner blank from which the inner door panel shown in FIG. 2 is formed.

Reference to a margin herein means a peripheral region of a sheet metal blank or panel located outside of the body portions 20, 36. The regions of the margins are each encompassed or bounded by solid lines 29 at the periphery of the blank and by the dotted margin lines 25, 27 as shown in FIGS. 3 and 4. For example, the margin 26 is defined as the area outside the body portion 20 that is bounded by margin line 25 and the entire outer edge designated by solid line 29 that intersects the line 25.

The inner door panel 14 is formed from an inner blank 34 shown in FIG. 4. The inner blank 34 includes a second door latch cutout 35, a generally rectangular central body portion 36 defined by dotted margin line 27 and four margins surrounding the body portion 36. The margins include a first side margin 38, a second side margin 40, a third end margin 42 and a fourth end margin 44. The fourth end margin 44 includes second hinge cutouts 46. The first and second door latch cutouts 18, 35 have shapes such that when aligned they may receive a door latch 48 (shown in FIG. 2). The first and second hinge cutouts 30, 46 have shapes for receiving a hinge 50 when they are aligned.

The inner and outer blanks 34, 16 are preformed into the shapes shown in FIGS. 3 and 4 by a process known to those skilled in the art such as by a sheet metal rolling and punching process. The inner and outer blanks 34, 16 are formed into the shape of the inner and outer door panels 14, 12 shown in FIGS. 1 and 2 by bending their margins and fastening portions in a manner known to those skilled in the art, such as by using a press break die.

With respect to the outer blank 16 shown in FIG. 3, the fastening portions 32 are bent downward into the page preferably by about 45 degrees with respect to the body portion 20. The fastening portions 32 may be bent at any angle and in any configuration so long as when the door panels 12, 14 are connected together, the welding locations adjacent the flanges 38, 40, 42, 44 and their associated fastening portions 32 is far enough away from the outer door panel 12 to inhibit warpage and distortion of the panel 12 caused by heat produced during welding. The angle of each of the fastening portions 32 with respect to the outer blank body 20 is preferably selected such that when the door panels 12, 14 are connected, the peripheral edges of the fastening portions 32 are spaced by at least ⅛ inch from the outer door panel 12. This prevents substantially all warpage and distortion of the outer panel 12 as a result of welding.

The outer blank margins 22, 24, 26 and 28 are then bent preferably by about 180 degrees out of the page with respect to the body portion 20 so that the margins 22, 24, 26 and 28 are substantially doubled over onto the body portion 20. This provides the outer blank 16 with reinforcement and blunt edges 52, thus adding an element of safety to the door assembly 10 by eliminating sharp edges.

As shown in FIG. 4, the inner blank 34 is formed into the shape of the inner door panel 14 by bending the first and second side margins 38, 40 and the third and fourth end margins 42, 44 preferably by an angle of about 90 degrees into the page with respect to the body portion 36. As shown in FIGS. 2 and 4 this forms two flanges or ribs 54 extending transverse to the body portion 36 each having an arcuate end portion 56 and two flanges or ribs 58 extending transverse to the body portion 36. This forms the inner door panel 14 as best shown in FIGS. 2 and 5.

The outer blank 16 is then preferably placed in a jig such as that described in U.S. Pat. No. 5,239,753. The outer blank 16 is preferably placed lengthwise in the jig so that the edges 52 at the bent first and second side margins 22, 24 are located between stop members and pusher members of the jig. The outer blank 16 is positioned adjacent a curved portion of the jig, so that the fastening portions 32 face away from the jig curved portion. The pusher members are advanced against one of the edges 52 at one of the bent first and second side margins 22, 24 to compress the outer blank 16 edgewise into the configuration of the curved surface of the jig. The side margins 22, 24 of the outer blank 16 are preferably crimped by an angle of about 25° with respect to the body portion 20 as shown in FIG. 2. This stiffens the outer door panel 12 and assists in maintaining its shape. This process forms the outer door panel 12, best shown in FIG. 1.

The inner and outer door panels 14, 12 are aligned as shown in FIGS. 2 and 5. The flanges 54 and 58 of the inner door panel 14 are disposed adjacent and preferably in contact with their associated fastening portions 32 of the outer door panel 12. The arcuate end portions 56 of the inner door panel ribs 54 engage a concave surface of the body portion 20 of the outer door panel 12 that was created by the curved surface of the jig.

Figure 7:
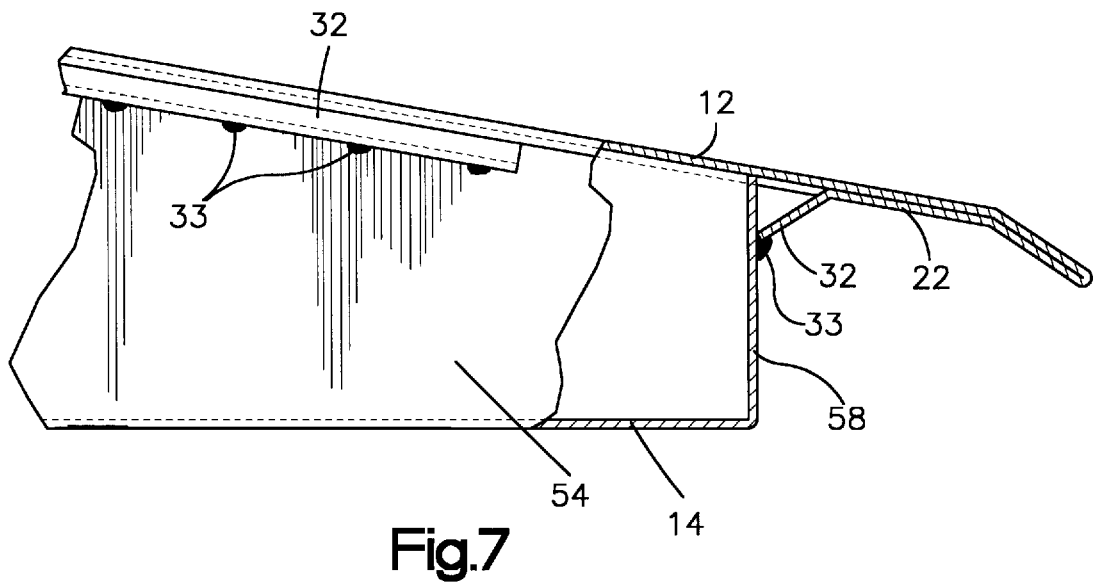
FIG. 7 is an enlarged partial cross-sectional view as seen along the plane designated by lines 7—7 in FIG. 5.
Figure 8:
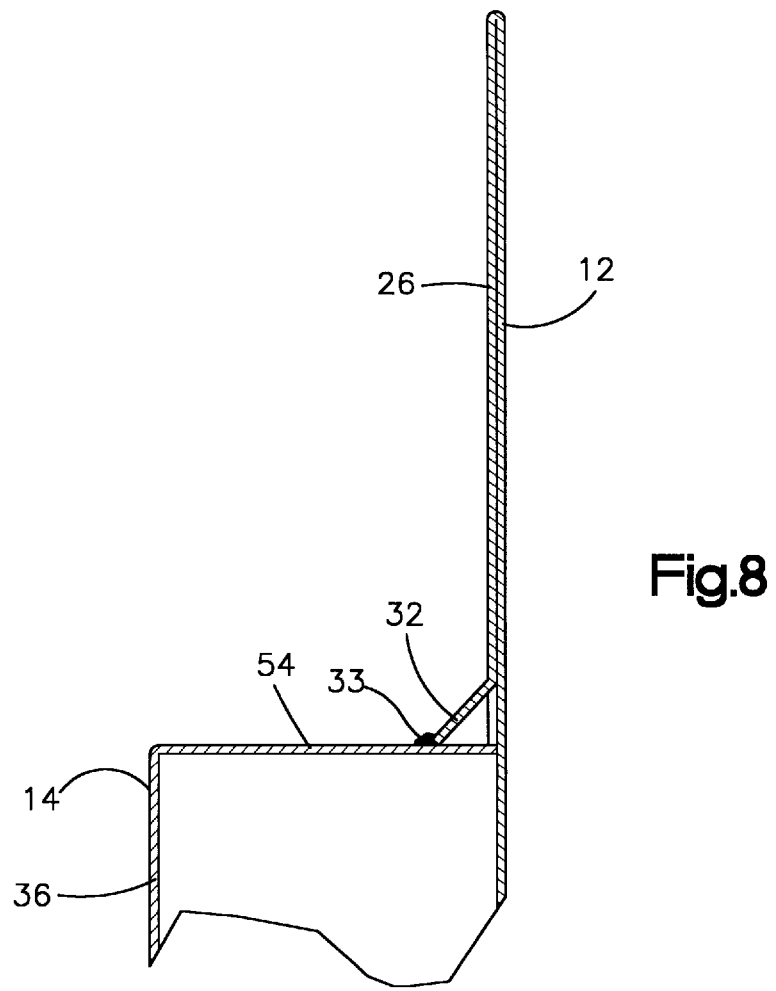
FIG. 8 is an enlarged partial cross-sectional view as seen along the plane designated by lines 8—8 in FIG. 5.

The inner and outer door panels 14, 12 are preferably fastened together by welding near the locations of the intersection of the fastening portions 32 with their associated flanges 54 and 58. The welds are shown in FIGS. 7 and 8 and not in the other Figures to improve the clarity of the other Figures. The manner of welding between the fastening portions 32 and the flanges 54 and 58 is within the purview of those of ordinary skill in the art. For example, in FIGS. 7 and 8 spot welds 33 are made between the fastening portions 32 and their associated flanges 54 and 58.

A hinge support may be welded to the interior of the door assembly 10 and a suitable sealant (not shown) may be applied to the hinge support. Joints 60 in the door assembly 10 are preferably sealed by caulking with a suitable material. Once the door assembly 10 is completely assembled, the latch 48 and the hinge 50 are mounted to it. The latch 48 preferably includes threaded studs for engaging threaded holes formed in the door assembly 10. The hinge 50 is preferably welded to the inner door panel 14.

Although the invention has been described in its preferred form with a certain degree of particularity, it will be understood that the present disclosure of the preferred embodiments has been made only by way of example and that various changes may be resorted to without departing from the true spirit and scope of the invention as hereafter claimed.

What is claimed is:

1. A vehicle door comprising a first sheet metal door panel including fastening portions at a peripheral portion of said first door panel, each of said fastening portions extending at a first angle of not greater than 90 degrees with respect to a body of said first door panel, a second sheet metal door panel including flange portions at a peripheral portion of said second door panel, each of said flange portions extending transverse to a body of said second door panel, said flange portions of said second door panel being disposed adjacent said fastening portions of said first door panel, said first angle being effective to prevent distortion of one of said first door panel and said second door panel during welding of said fastening portions and said flange portions, and at least one weld connecting said fastening portions to said flange portions.

2. The vehicle door of claim 1 wherein the first angle at which each of said fastening portions extends is about 45 degrees with respect to the body of said first door panel.

3. The vehicle door of claim 2 said flange portions each extending from said second door panel at an angle of about 90 degrees with respect to the body of said second door panel.

4. The vehicle door of claim 1 said first door panel being an outer door panel and said second door panel being an inner door panel.

5. The vehicle door of claim 1 said door being a door for a storage compartment.

6. A method of making a vehicle door comprising the steps of providing a first sheet metal door panel with fastening portions at a peripheral portion of said first door panel, each of said fastening portions extending at a first angle of not greater than 90 degrees with respect to a body of said first door panel, providing a second sheet metal door panel with flange portions at a peripheral portion of said second door panel, said flange portions extending transverse to a body of said second door panel, said first angle being effective to prevent distortion of one of said first door panel and said second door panel during welding of said fastening portions and said flange portions, and welding said fastening portions of said first door panel to said flange portions of said second door panel.

7. The method of claim 6 further comprising compressing said first door panel edgewise to provide said first door panel with a curvature.

8. The method of claim 6 wherein the first angle at which each of said fastening portions extends is about 45 degrees with respect to the body of said first door panel.

9. The method of claim 8 said flange portions each extending from said second door panel at an angle of about 90 degrees with respect to the body of said second door panel.

10. The method of claim 6 said first door panel being an outer door panel and said second door panel being an inner door panel.

11. A vehicle door made according to the method of claim 6.

12. The vehicle door of claim 1 wherein said fastening portions extend into contact with said flange portions at an acute angle relative to a portion of said first door panel inward of an adjacent one of said flange portions.

13. The vehicle door of claim 1 wherein an end of the fastening portions is spaced apart from the first door panel and each said weld is disposed between said end of the fastening portions and said flange portions which extend transverse to the body of said second door panel.

14. The method of claim 6 comprising spacing an end of the fastening portions apart from the first door panel and positioning each said weld between said end of the fastening portions and said flange portions which extend transverse to the body of said second door panel.

* * * * *